United States Patent
Yeah

(10) Patent No.: US 6,330,174 B1
(45) Date of Patent: Dec. 11, 2001

(54) HIGH EFFICIENCY UNINTERRUPTIBLE POWER SUPPLY

(76) Inventor: Hong-Ching Yeah, 20th Fl., No. 105, Sec. 2, Tunhua S. Rd., Taipei (TW)

(*) Notice: Subject to any disclaimer, the term of this patent is extended or adjusted under 35 U.S.C. 154(b) by 0 days.

(21) Appl. No.: 09/769,231

(22) Filed: Jan. 24, 2001

(51) Int. Cl.[7] ............................. H02M 7/04; H02J 7/00
(52) U.S. Cl. .................................................. 363/89; 307/64
(58) Field of Search ........................... 363/79, 89, 125, 363/126; 307/64, 82

(56) References Cited

U.S. PATENT DOCUMENTS

| | | | |
|---|---|---|---|
| 4,783,728 | * 11/1988 | Hoffman | 363/37 |
| 5,172,009 | * 12/1992 | Mohan | 307/46 |
| 5,334,877 | * 8/1994 | Mohan et al. | 307/46 |
| 5,781,422 | * 7/1998 | Lavin et al. | 363/37 |

* cited by examiner

Primary Examiner—Adolf Deneke Berhane
(74) Attorney, Agent, or Firm—Thorp Reed & Armstrong

(57) ABSTRACT

There is disclosed a high efficiency uninterruptible power supply. A voltage boost unit is provided to transform and boost the voltage of an input power for being supplied to a load. A backup power supply unit is connected to the output ends of the voltage boost unit. An average current mode controller detects a current value of the input power when the input power is normally supplied, and detects a current value of the backup power supply unit when the input power is interrupted. A voltage mode controller controls the backup power supply unit to output power based on the current value of the backup power supply unit detected by the average current mode controller. A detection/control unit detects the input and output voltages of the voltage boost unit, so as to determine whether to drive the average current mode controller and the voltage mode controller.

5 Claims, 5 Drawing Sheets

HIGH EFFICIENCY UNINTERRUPTIBLE POWER SUPPLY

BACKGROUND OF THE INVENTION

1. Field of the Invention

The present invention relates to an uninterruptible power supply, which is operating in a current control mode when the backup power is activated to supply power, so as to enhance the efficiency and increase the lifetime of the battery.

2. Description of Related Art

FIG. 4 shows a conventional uninterruptible power supply, which includes a voltage boost unit 80, an average current mode controller 81 (ACMA), a backup power supply unit 82 and a detection/control unit 83. The voltage boost unit 80 is arranged between power input ends L and N and the inverter (not shown), and is composed of a voltage-boost coil L, a bridge rectifier BD, two diodes D1 and D2, and two capacitors C1 and C2, etc, wherein the bridge rectifier is controlled by an electronic switch Q to be turned on or turned off.

The average current mode controller 81 is provided to detect and control the output voltage of the voltage boost unit 80. The average current mode controller 81 detects the current value of the input choke L from a current transformer CT of the voltage boost unit 80, so as to control the power supply operation of the average current mode controller 81 via the electronic switch Q.

The backup power supply unit 82 includes a DC/DC converter 821, a battery set 822 connected to the input of the DC/DC converter 821, and a voltage mode controller (VMC) 823 for controlling the DC/DC converter 821. The DC/DC converter 821 is provided to boost the output voltage of the battery set 822. The output ends of the DC/DC converter 821 are connected to the output ends +BUS and −BUS of the voltage boost unit 80 in parallel for supplying backup power. The voltage mode controller 823 is provided to detect the output voltage of the DC/DC converter 821, so as to provide a feedback signal to the DC/DC converter 821 thereby controlling the output voltage.

The detection/control unit 83 is typically composed of a microprocessor or analog and digital integrated circuits, and is provided to monitor various signals, such as input and output voltages, and sub-control units, such as the controller in the DC/DC converter, of the uninterruptible power supply.

In the above circuit, when utility power is supplied from the power input ends normally, the average current mode controller 81 detects the current value of the input choke via the current transformer CT, and further drives the voltage boost unit 80 via the electronic switch Q to transform the input power for being supplied to the load.

When the utility power supplied from the power input ends is interrupted, the detection/control unit 83 will detect the interruption, and simultaneously activates the voltage mode controller 823 to control the DC/DC converter 821, so as to convert the voltage of the battery set 822 into a higher voltage for being supplied to the load.

With such a conventional uninterruptible power supply, it is known that the average current mode controller is operated only when the utility power is normally supplied. When the utility power is interrupted, it is the voltage mode controller 823 that is used to control the DC/DC converter 821 to operate. However, the disadvantage of simply using the voltage mode controller 823 is that only the output voltage is controlled while the input current can not be controlled, resulting in a large root mean square (RMS) value of the input current, thus, having an higher loss and lower efficiency. It may be applicable to use the average current mode controller to control the DC/DC converter 821 to increase the efficiency, but unfortunately, the average current mode controller available in the market is designed for power factor correction (PFC). Thus it is suitable to operate when the utility power is normal. Such an average current mode controller is not appropriate for controlling the DC/DC converter shown in FIG.

Therefore, there is a desire to have an improved uninterruptible power supply to mitigate and/or obviate the aforementioned problems.

SUMMARY OF THE INVENTION

The object of the present invention is to provide a high efficiency uninterruptible power supply, which supplies backup power in a average current control mode, so as to enhance the efficiency and increase the lifetime of the battery.

To achieve the object, the high efficiency uninterruptible power supply of the present invention comprises: a voltage boost unit to transform and boost the voltage of an input power for being supplied to the inverter; a backup power supply unit connected to output ends of the voltage boost unit; an average current mode controller for detecting a current value of the input power when the input power is normally supplied, and for detecting a current value of the backup power supply unit when the input power is interrupted; a voltage mode controller included in the backup power supply for controlling the backup power supply unit to output power based on the current value of the backup power supply unit detected by the average current mode controller; and a detection/control unit for detecting input and output voltages of the voltage boost unit, so as to determine whether to drive the average current mode controller and the voltage mode controller. This inverter converts DC bus voltage to sine-shape output.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
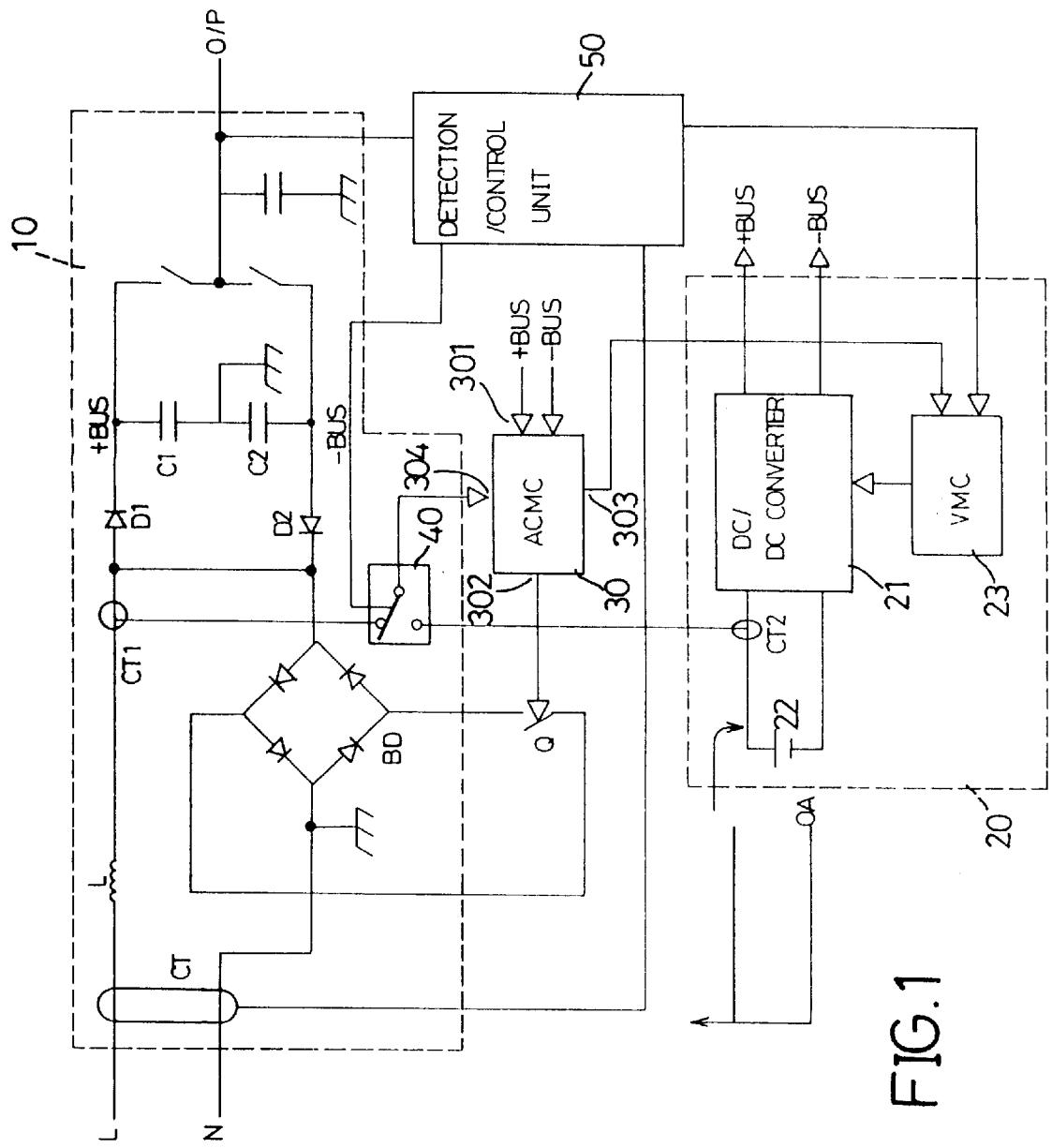
FIG. 1 is a schematic diagram of the high efficiency uninterruptible power supply in accordance with the present invention.

FIG. 1 shows the structure of a high efficiency uninterruptible power supply in accordance with the present invention, which includes a voltage boost unit 10, a backup power supply unit 20, an average current mode controller 30 (ACMA), and a detection/control unit 50.

The voltage boost unit 10 is arranged between power input ends L and N and the load (not shown) to transform and boost the voltage of the input power for being supplied to the inverter, and is composed of a voltage-boost coil L, a bridge rectifier BD, two diodes D1 and D2, and two capacitors C1 and C2, etc, wherein the bridge rectifier is controlled by an electronic switch Q to be turned on or turned off.

The backup power supply unit 20 is connected to the output ends +BUS and –BUS of the voltage boost unit 10, and includes a DC/DC converter 21, a battery set 22 connected to the input of the DC/DC converter 21, and a voltage mode controller (VMC) 23 connected to the output of the DC/DC converter. The DC/DC converter 21 is provided to convert and boost the voltage of the battery set 22 for output. The output ends of the DC/DC converter 21 are connected to the output ends +BUS and –BUS of the voltage boost unit 10 in parallel for supplying backup power to the inverter.

Figure 2:
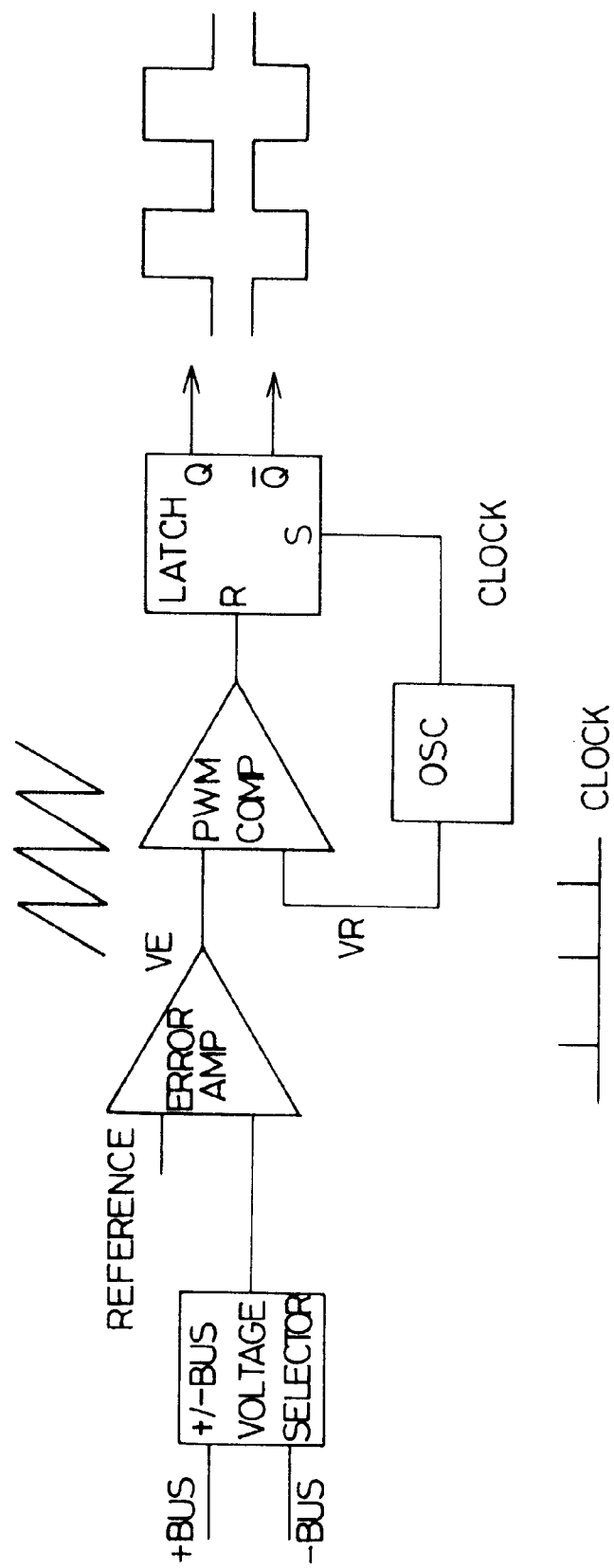
FIG. 2 is a schematic diagram of the voltage mode controller.

The voltage mode controller 23 is provided to control the output voltage of the backup power unit 20. A detailed circuit diagram of the voltage mode controller 23 is shown in FIG. 2. The output of the voltage mode controller 23 is connected to the DC/DC converter 21 for providing a feedback signal to the DC/DC converter 21 thereby controlling the output voltage.

Figure 3:
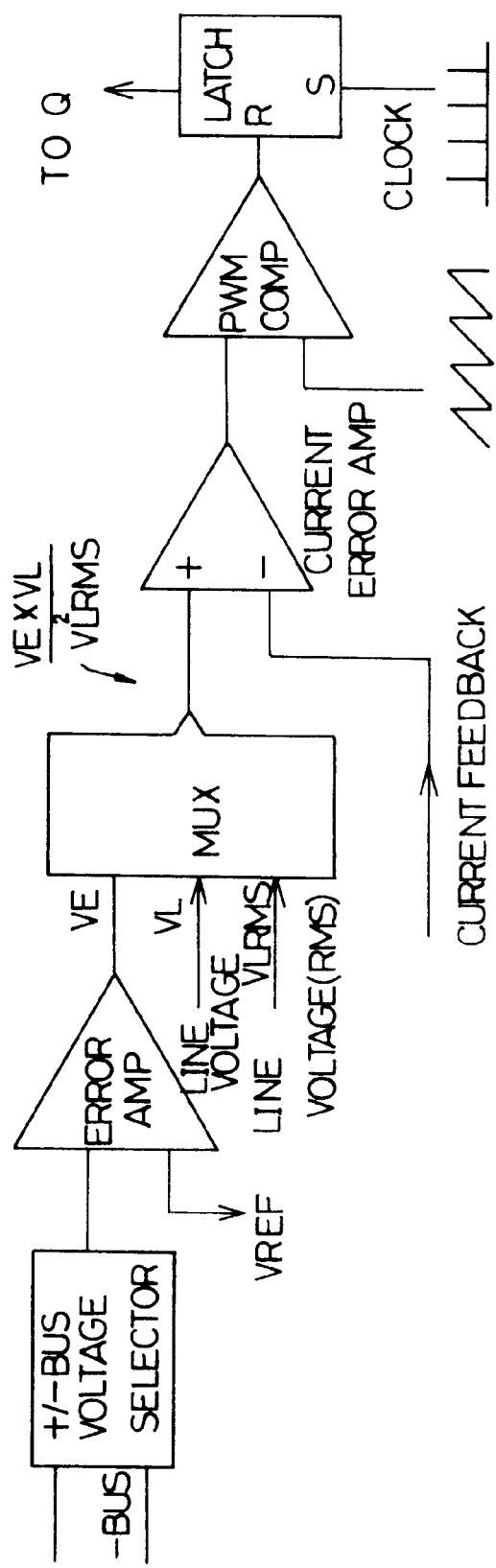
FIG. 3 is a schematic diagram of the average current mode controller.
Figure 4:
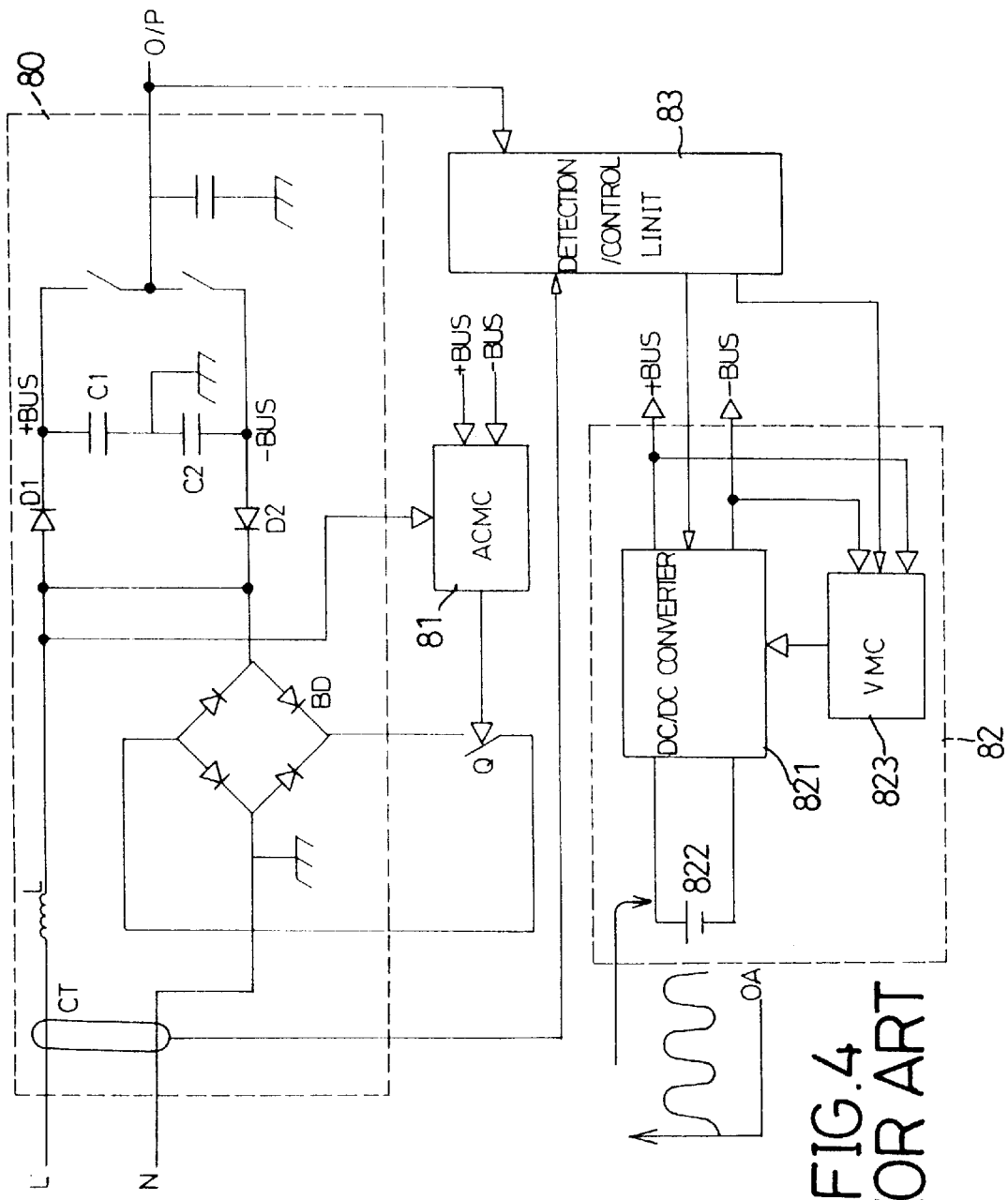
FIG. 4 is a schematic diagram of a conventional uninterruptible power supply in accordance with the present invention.
Figure 5:
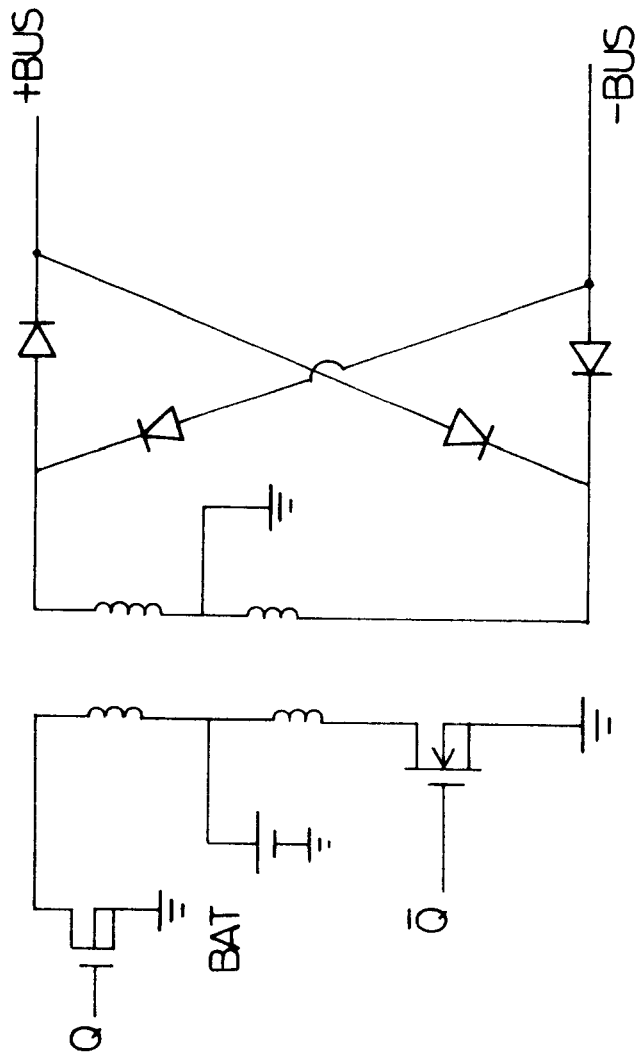
FIG. 5 is a schematic diagram of a DC/DC converter.

The detection/control unit 50 is provided to detect the input and output voltages of the voltage boost unit 10 so as to determine whether to drive the average current mode controller 30 and the voltage mode controller 23. The average current mode controller 30 is provided to detect the current value through the boost choke L of the voltage boost unit 10 when the utility power is normally supplied, and to detect the current value of the backup power unit 20 when the utility power is interrupted. A detailed circuit diagram of the average current mode controller 30 is shown in FIG. 3. The aforementioned voltage mode controller 23 and average current mode controller 30 are known to those skilled in the art, and can be implemented by integrated circuits UC3525 and UC3854, respectively. Therefore, a detailed description is deemed unnecessary.

The average current mode controller 30 is connected in such a manner that the voltage detection ends 301 are connected to the output ends +BUS and –BUS of the voltage boost unit 10; the control signal output end 302 is connected to the electronic switch Q to control whether to turn on or turn off the electronic switch Q; the current amplification error signal output end 303 is connected to the voltage detection end of the voltage mode controller 23; the current detection end 304 is connected to the voltage-boost coil L of the voltage boost unit 10 and the input of the DC/DC converter 21 through a switch 40 and two current transformers CT1 and CT2, respectively.

The switch 40 is controlled by the detection/control unit 50 in such a manner that, when the utility power is supplied normally, the average current mode controller 30 is switched to connect to the current transformer CT1, and when the utility power is interrupted, the average current mode controller 30 is switched to connect to the current transformer CT2. Therefore, when the utility power is normal, the average current mode controller 30 receives the current value of the boost choke via the switch 40 and the current transformer CT1. The received current value is given to the detection/control unit 50, so as to control the output signal of the voltage boost unit 10 via the electronic switch Q, thereby enabling the voltage boost unit 10 to supply suitable power to the load. When the utility power is interrupted and the detection/control unit 50 detects such interruption, the backup power unit 20 is driven to operate. The output voltage of the battery set 22 is converted by the DC/DC converter 21, so as to boost the voltage and supply the power to the load for emergency use. At this moment, the detection/control unit 50 drives the switch 40 so that the average current mode controller 30 is connected to the current transformer CT2. Therefore, the average current mode controller 30 receives the current value of the output power of the battery set 22 via the switch 40 and the current transformer CT2. The received current value is processed by the average current mode controller 30 and sent to the voltage mode controller 23, and thus the voltage mode controller 23 is able to adjust the voltage of the output power of the DC/DC converter 21, thereby enabling the backup power unit 20 to supply suitable power to the load.

With the circuit of the present high efficiency uninterruptible power supply, it is known that the input current of the uninterruptible power supply can be effectively controlled no matter if the utility power is normally supplied or is interrupted. Particularly, when the backup power is supplied, the current input from the battery set 22 is effectively controlled. This RMS current value is much smaller than that of prior design. Therefore, the battery set 22 is able to supply power for a longer time and the power supply efficiency is increased, so that the lifetime of the battery set 22 is greatly increased, and if necessary, a battery set with a lower volume can be used to reduce the cost.

In view of the foregoing, it is appreciated that there is a significant improvement in the power supply efficiency for the high efficiency uninterruptible power supply in accordance with the present invention. In a practical test, the discharge efficiency is increased by 5% compared to the conventional skill. Although the present invention has been explained in relation to its preferred embodiment, it is to be understood that many other possible modifications and variations can be made without departing from the spirit and scope of the invention as hereinafter claimed.

What is claimed is:

1. A high efficiency uninterruptible power supply comprising:
    a voltage boost unit to transform and boost the voltage of an input power for being supplied to a load;
    a backup power supply unit connected to output ends of the voltage boost unit;
    an average current mode controller for detecting a current value of the input power when the input power is normally supplied, and for detecting a current value of the backup power supply unit when the input power is interrupted;

a voltage mode controller included in the backup power supply for controlling the backup power supply unit to output power based on the current value of the backup power supply unit detected by the average current mode controller; and a detection/control unit for detecting input and output voltages of the voltage boost unit, so as to determine whether to drive the average current mode controller and the voltage mode controller.

2. The high efficiency uninterruptible power supply as claimed in claim 1, wherein the voltage boost unit is composed of a voltage-boost coil, a bridge rectifier, two diodes, and two capacitors; the bridge rectifier is controlled by an electronic switch to be turned on or off; and the electronic switch is controlled by the average current mode controller.

3. The high efficiency uninterruptible power supply as claimed in claim 1, wherein the backup power supply includes a DC/DC converter, a battery set connected to an input of the DC/DC converter, and the voltage mode controller connected to an output of the DC/DC converter.

4. The high efficiency uninterruptible power supply as claimed in claim 2, wherein the average current mode controller has:

a set of voltage detection ends connected to the output ends of the voltage boost unit;

a control signal output end connected to the electronic switch to control whether to turn on or turn off the electronic switch;

a current amplification error signal output end connected to a voltage detection end of the voltage mode controller; and a current detection end connected to a switch for being selectively connected to the voltage boost unit via a first current transformer and the backup power unit via a second current transformer, the switch being controlled by the detection/control unit.

5. The high efficiency uninterruptible power supply as claimed in claim 4, wherein the voltage mode controller and the average current mode controller are implemented by integrated circuits UC3525 and UC3854, respectively.

* * * * *